United States Patent [19]

Thornton

[11] Patent Number: 4,815,429

[45] Date of Patent: Mar. 28, 1989

[54] PISTON HEAD FOR AN INTERNAL COMBUSTION ENGINE AND A COMPRESSION RING THEREFOR

[75] Inventor: Thomas E. Thornton, Baltimore, Md.

[73] Assignee: Combustion Technologies, Inc., Columbus, Ind.

[21] Appl. No.: 65,899

[22] Filed: Jun. 24, 1987

[51] Int. Cl.$^4$ ............................................... F02F 5/00
[52] U.S. Cl. .................................. 123/193 P; 277/170
[58] Field of Search ...................... 123/193 P; 92/208; 277/27, 216, 168, 170, 171

[56] References Cited

U.S. PATENT DOCUMENTS

| 2,177,700 | 10/1939 | Fisher | 277/216 |
| 3,727,927 | 4/1973 | Packard | 277/170 |
| 3,887,198 | 6/1975 | McClure et al. | 277/27 |

FOREIGN PATENT DOCUMENTS 0496107 11/1938 United Kingdom ................ 277/216

*Primary Examiner*—Willis R. Wolfe
*Assistant Examiner*—M. Macy
*Attorney, Agent, or Firm*—Neuman, Williams, Anderson & Olson

[57] ABSTRACT

A compression ring is provided for mounting in an annular groove formed in a piston head utilized in an internal combustion engine. The ring includes an inner section positionable within the groove and an outer section protruding from the groove for sliding sealing engagement with the wall of the cylinder in which the piston head is reciprocally mounted. The ring inner section is provided with opposite side surfaces. Each side surface includes a first segment extending inwardly from the outer section and being in substantially parallel relation with an adjacent side wall of the groove in which it is accommodated. The ring side surface also includes a second segment which is angularly disposed relative to and extends inwardly from the first segment and is in continuous spaced relation with the adjacent side wall of the groove. The distance between the first segments of the ring inner section side surfaces are less than the distance between the side walls of the groove. Thus, when the ring is disposed within the groove, the first segment of one side surface of the ring inner section coacts with the adjacent side wall of the groove to form a first clearance. The first clearance communicates with a second clearance formed between the second segments of both side surfaces of the ring inner section. The first and second clearances communicate with a combustion chamber within the cylinder when the piston head is moving in its power stroke within the cylinder.

3 Claims, 1 Drawing Sheet

U.S. Patent  Mar. 28, 1989  4,815,429
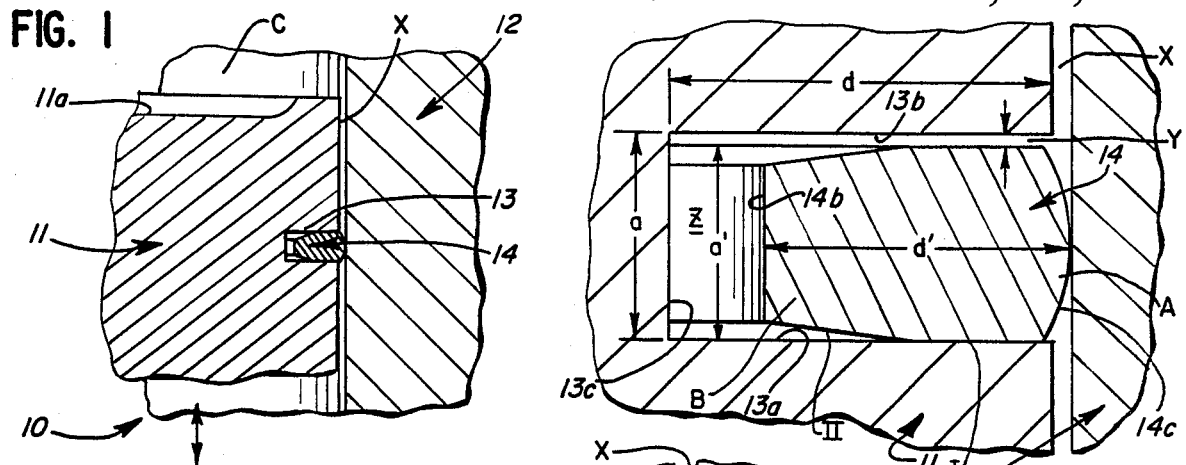
FIG. 1
FIG. 2
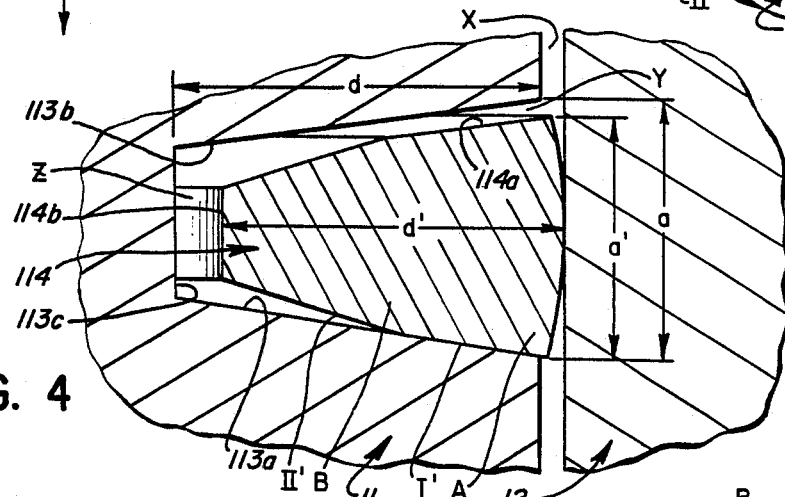
FIG. 4
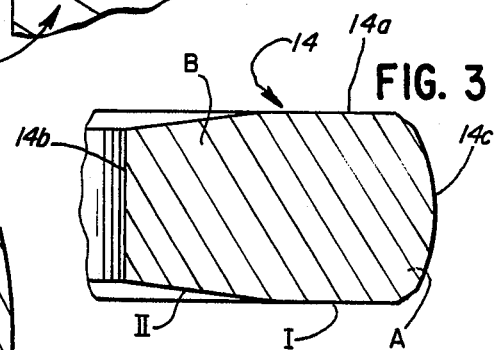
FIG. 3
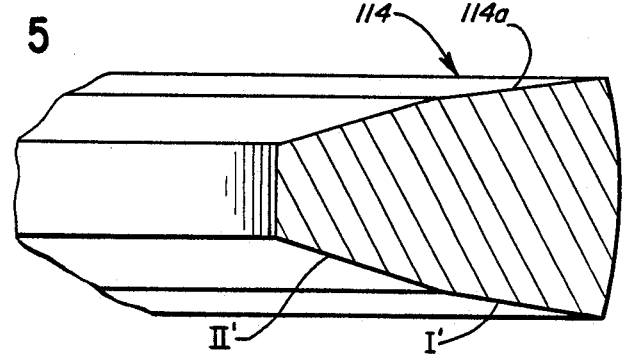
FIG. 5
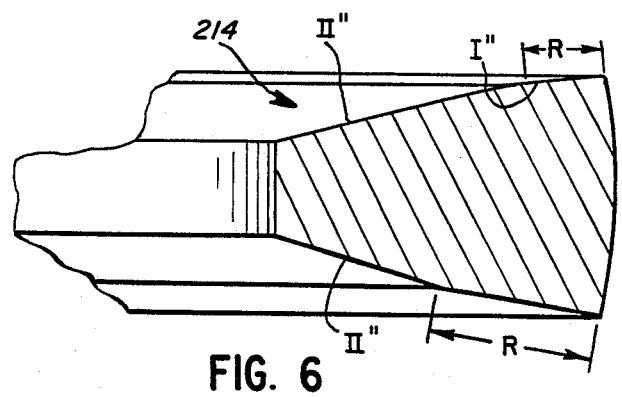
FIG. 6
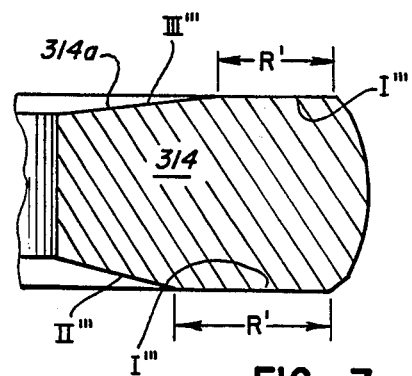
FIG. 7

PISTON HEAD FOR AN INTERNAL COMBUSTION ENGINE AND A COMPRESSION RING THEREFOR

BACKGROUND OF THE INVENTION

Compression rings of various cross-sectional configurations (e.g. rectangular & keystone) have heretofore been utilized in various types of internal combustion engines. When utilized in heavy-duty diesel automotive applications, it has been found that rectangular compression rings have a propensity to stick in the piston head groove after a relatively short period of time. The sticking problem occurs by reason of carbon encrustations forming within the clearance between a side surface of the ring and an adjacent side wall of the groove. When the carbon encrustations have grown to a size wherein there is no longer clearance, an axial side force is exerted within the groove. By having a large clearance between the ring and the groove side wall, serious build up of carbon encrustations can be delayed to a certain extent; however, this advantage is outweighed by the fact that the incidents of ring breakage are directly proportional to the increase in the size of the side clearance between the ring and groove side wall.

With keystone rings the sticking problem is substantially avoided where the tangent of the keystone side angle of the ring is greater than the coefficient of friction between the ring and the groove side wall. When, however, a conventional keystone shaped ring is being utilized it is necessary that a complemental precision ground keystone groove be formed in the piston head. Such a machining operation is more complex and costly than forming a conventional rectangular groove in the piston head.

The capability presently exists to produce at less cost much tighter width tolerances on both conventional rectangular shaped rings and grooves than on the keystone shaped counterparts. Furthermore, in operation the side clearance of a rectangular shaped ring will normally increase due to ring side wear and/or groove side wall wear, whereas, with a keystone ring there are normally four conditions which will increase such clearance; namely, ring side wear, groove side wall wear, wear at the outside diameter of the ring, and/or radial piston head motion, sometimes referred to as "slap."

SUMMARY OF THE INVENTION

Thus, it is an object of this invention to provide a compression ring which is less costly, more durable, stick-resistant and will operate effectively in a conventional rectangular groove formed in a piston head.

It is a further object to provide an improved compression ring which eliminates the need for costly Ni-resist inserts (i.e. a nickel-containing cast iron) in the piston head grooves.

It is a further object to provide an improved compression ring in which there is less ring/groove friction during radial motion of the piston within the cylinder.

It is a still further object to provide an improved compression ring wherein the ring/groove contact occurs near the periphery of the piston head which is a relatively cooler location than the interior of the groove.

Further and additional objects will appear from the description, accompanying drawings and appended claims.

In accordance with one embodiment of the invention an improved compression ring is provided for disposition within an annular groove formed in the piston head of an internal combustion engine. The ring includes an inner section disposed within the groove and an outer section protruding outwardly from the groove and in sliding, sealing engagement with the wall of the cylinder in which the piston head is reciprocally mounted. The ring inner section is provided with opposite side surfaces, each having a first segment extending inwardly from the outer section and being substantially parallel to an adjacent side wall of the groove. A second segment extends inwardly from the first segment and is angularly disposed relative thereto. When the piston head is moving in one relative direction within the cylinder, the first segment of one side surface of the ring inner section coacts with the adjacent side wall of the groove to form a first clearance which communicates with the combustion chamber formed adjacent the upper end of the cylinder. The second segments of both side surfaces of the ring inner section also coact with the groove side walls to form second clearances which communicate with the first clearance.

DESCRIPTION

For a more complete understanding of the invention reference is made to the drawings wherein:

FIG. 1 is a fragmentary vertical sectional view of a piston head showing one embodiment of the improved compression ring disposed within a groove formed in the piston head and with the compression ring in sliding, sealing engagement with the cylinder wall.

FIG. 2 is an enlarged fragmentary sectional view showing the ring embodiment of FIG. 1 disposed within a conventional rectangular groove and showing the first and second clearances formed between the compression ring and the side and end walls of the groove.

FIG. 3 is an enlarged vertical sectional view of the improved compression ring per se shown in FIG. 2.

FIG. 4 is similar to FIG. 2 but showing a second embodiment of the improved compression ring accommodated within a conventional keystone groove formed in a piston head.

FIG. 5 is similar to FIG. 3 but of the second embodiment per se of the improved compression ring shown in FIG. 4.

FIG. 6 is similar to FIGS. 3 & 5 but of a third embodiment of the improved compression ring.

FIG. 7 is similar to FIG. 6 but showing a fourth embodiment of the improved compression ring.

Referring now to the drawings and more particularly to FIG. 1, a piston-cylinder assembly 10 for an internal combustion engine is shown wherein a piston head 11 is mounted for reciprocatory movement within a cylinder 12, the latter normally includes a liner. In a conventional engine a plurality of cylinders are provided in an engine block, not shown. The cylinders are usually arranged in either an in-line or V relation. Overlying the exposed ends of the cylinders is a cylinder head assembly which includes sets of exhaust and intake valves, fuel injectors, rocker arms, etc., all of which are well known in the engine art. Pivotally connected to each piston head and extending through the opposite end of the cylinder is a piston rod, not shown, which in turn as connected to a suitable crankshaft.

When the piston head 11 approaches the top of its stroke, the upper surface 11a of the piston head coacts with the cylinder head and wall of the cylinder to form a combustion chamber C where in a diesel engine, a mixture of atomized fuel and air is compressed to such an extent that it explodes resulting in very high temperatures and pressures being developed within the combustion chamber causing the piston head to move downwardly relative to the cylinder in a power stroke by the force of the combustion gases developed within the chamber.

To prevent blow-by of the combustion gases from the combustion chamber C past the piston head, which would otherwise result in a significant loss of power, each piston head carries several rings or seals which slidably and sealingly engage the corresponding cylinder wall. Formed in the piston head is an upper annular groove 13 or 113 which is spaced a predetermined distance from the end face 11a of the piston head. A clearance is formed between the periphery of the piston head and the cylinder wall and communicates at one end with the groove 13 or 113 and at the opposite end with the portion of the cylinder disposed above the piston head endface which includes the combustion chamber C when the piston head is near the top of its compression stroke.

Accommodated within groove 13 or 113 is the improved compression ring 14 and 114. The type of compression ring will determine the configuration of the groove or vice versa. In either arrangement, the groove has an axial dimension a and a depth dimension d which are greater than corresponding dimensions a' and d' of the ring 14 or 114, see FIGS. 2 and 4. By reason of the dimensional differential the rings are capable of moving relative to the groove as the piston head is reciprocating within the cylinder. When the piston head is moving downwardly in its power stroke, the compression gases fill clearance X and force the compression ring against the lower side wall 13a or 113a of the groove 13, 113 causing a clearance Y to be formed between the upper side wall 13b or 113b of the groove and the adjacent side surface 14a and 114a of the ring 14, 114, see FIGS. 2 and 4. There is also a clearance Z formed between the inner wall 13c or 113c of the groove and the inner surface 14b or 114b of the ring. It is to be noted in FIGS. 2 and 4 that the clearances X, Y and Z communicate with one another and with the aforementioned combustion chamber C.

Typically, a compression ring is made of either cast iron or steel strip material. Depending upon the configuration of the groove, the conventional compression ring has either a rectangular or keystone cross-sectional shape. A conventional rectangularly shaped ring has substantially parallel top and bottom side surfaces which are parallel throughout with the corresponding side walls of the rectangular groove formed in the piston head. A conventional keystone-shaped ring, on the other hand, has tapering side surfaces which in turn are substantially parallel with the corresponding side walls of the keystone-shaped groove formed in the piston head.

It has been found in the past that conventional rectangular rings and piston head grooves therefor are less costly to produce; however, the rings have a propensity to stick within the groove after a relatively short period of time due to carbon encrustations forming within the clearance between the side surfaces of the ring and the side walls of the groove. The encrustations grow until the side clearance is eliminated whereupon axial side force is produced upon further pressure being exerted on the ring by the combustion gases. When the axial side force multiplied by the coefficient friction becomes greater than the inherent radial tension of the ring the latter becomes permanently stuck in the groove.

The conventional keystone shaped ring is not normally beset with a sticking problem particularly where the tangent of the keystone side angle is greater than the coefficient of friction between the ring and the side walls of the groove. While the conventional keystone-shaped ring overcomes the sticking problem inherent in the conventional rectangular ring, i is nevertheless beset with other significant problems; namely, the relatively high cost of machining the groove in the piston head to conform substantially to the keystone shape of the ring; side clearance is susceptible to being increased during operation of the engine due to ring side wear, groove side wear, ring O.D. wear and/or radial piston motion which results in the incidents of ring breakage being markedly increased.

The improved compression rings 14, 114, 214 and 314 minimize, if not eliminate the aforenoted shortcomings which beset the conventional rectangular and keystone-shaped rings and at the same time eliminate the need for costly Ni-resist inserts being utilized in the top groove or top two grooves formed in the piston head. In prior piston head and compression ring assemblies it was common to utilize such inserts in order to minimize both groove wear and ring side wear.

Improved compression ring 14, as seen more clearly in FIG. 2, is adapted to be mounted within a conventional rectangularly shaped annular groove 13. It is a relatively inexpensive machining operation to form such a groove in a piston head as compared to forming a keystone groove wherein manufacturing tolerances are more restrictive. Thus, for this reason in some instances ring 14 is preferred. Ring 14 includes an outer section A which protrudes outwardly from the groove and slidably and sealingly engages the wall of the cylinder 12 in which the piston head is mounted. The ring 14 also includes an inner section B which is disposed within the groove itself. The side surfaces 14a of the ring coact with an inner surface 14b thereof to define the inner section B of the ring. Each side surface 14a of the ring inner section B includes a first segment I which extends radially inwardly from the outer section a predetermined distance; the latter being within a range of from about ⅓ to about ⅔ of the total radial dimension of the side surface. The first segments I are parallel to one another and to the corresponding side walls 13a and b of the groove. The second segment II of each side surface extends inwardly from the first segment and away from the adjacent groove side wall 13a or 13b at an angle from about 4° to about 10°. Thus, regardless of the relative position of the ring 14 within groove 13, the second segment II of each inner section side surface will always be out of engagement with the adjacent side wall of the groove. As a result of this non-engagement the pressure of the combustion gases, entrapped within the groove, will be exerted on the second segment II of the ring side surface adjacent groove side wall 13a and thereby reduce the total force exerted by the combustion gases on the opposite side surface of the ring driving the latter against the groove side wall 13a. Thus, the friction between the first segment I of the ring inner section side surface and the groove side wall 13a will be less thereby reducing the ring side wear and the groove side wear. The reduced friction also allows the ring to move relative to the groove more readily and thereby prevent the build up of carbon encrustations within the clearance Y and eliminate sticking problems.

As illustrated, the outer section A of ring 14 has a convex or barrel shaped surface 14c which slidably and sealingly engages the cylinder wall. Other configurations for the outer section A may be employed, such as taper or straight faced to mention but a few.

Where a keystone-shaped groove 113 is formed in the piston head, a modified keystone ring 114 is provided which incorporates the virtues of a conventional keystone ring and minimizes, if not eliminates the shortcomings thereof. As seen in FIGS. 4 and 5, ring 114 includes an outwardly projecting outer section. A' which has a convex or barrel shaped surface 114c similar to that of outer section A of ring 14. Ring 114 also has an inner section B' which is integral with the outer section and is disposed within the piston head keystone-shaped groove 113. The inner section B' is provided with opposite side surfaces 114a which are of like configuration. The side surfaces 114a include first segments I' which taper inwardly a predetermined distance from the outer section A'. The predetermined distance may vary from about ⅓ to about ⅔ of the total radial dimension of the side surface. The angular disposition of the first segment I' of each side surface of the ring inner section B' with respect to a plane perpendicular to the axis of the cylinder is sometimes referred to as the primary keystone angle. The primary keystone angle of ring 114 corresponds to the angular disposition of the side walls 113a and 113b of the groove 113 and thus, the first segments I' are substantially parallel to the side walls 113a, 113b.

The ring inner section side surfaces are also provided with second segments II' which taper inwardly from the first segments I' at a greater angle, sometimes referred to as the secondary keystone angle. By reason of the differential between the primary and secondary keystone angles, the second segments II' of the ring inner section side surfaces 114a will never engage the adjacent groove side walls 113a, 113b regardless of the relative position of the ring 114 within the groove.

As in the case of ring 13, the high pressure combustion gases entrapped within groove 113, when the piston head is in its power stroke, will counter-act to a certain extent a portion of the total force exerted on the ring driving it against the groove side wall 113a, thereby, reducing the friction between the ring side surface and the groove side wall.

Modified ring 214, shown in FIG. 6 is similar to ring 114 except that the radial dimensions R of the first segments I'' of the side surfaces 214a are unequal. Nonetheless, ring 214 is adapted to be mounted within groove 113. It is preferred that the ring be mounted in the groove so that the longer first segment I'' of the side surface engages the lower side wall 113a of the groove. Because the first segments I'' are of unequal dimensions, the second segments II'' are also of unequal dimensions with the shorter second segment being disposed adjacent the lower groove side wall 113a.

A fourth embodiment 314 of the improved compression ring is shown in FIG. 7. Ring 314 is similar to ring 14, except that the first segment I''' of the inner section side surfaces 314a have unequal radial dimensions R'. The same is true with respect to lengths of the second segments II''''. Ring 314 is preferably mounted within a rectangular groove so that the longer first segment and the shorter second segment are adjacent the lower side wall 13a of the groove.

It should be noted that with all versions of the improved compression ring, the frictional contact between the first segment of the ring inner section side surface and the lower side wall of the groove occurs adjacent the open side of the groove which is relatively cooler than the inner portions of the groove. Therefore, any deleterious thermal effects on either the ring or groove walls are reduced.

Thus, an improved compression ring has been provided which is of simple, inexpensive and durable construction; can be readily utilized in either conventional rectangular or keystone-shaped grooves; and eliminates the need for costly Ni-resist inserts being incorporated in the piston head.

I claim:

1. A reciprocating piston for mounting within a cylinder of an internal combustion engine, said piston comprising a piston head having an endface forming a wall of a combustion chamber when the piston assumes a predetermined relative position within the cylinder; an annular groove formed in a peripheral surface of said piston head and spaced from said endface, said peripheral surface being adapted to substantially conform to but being spaced inwardly from a wall defining the cylinder; and a compression ring adjustably mounted within said groove; said groove being spaced a predetermined axial distance from said endface and being provided with spaced inwardly extending side walls, and a recessed inner wall, the latter defining the depth of the groove; said compression ring having an inner section disposed within said groove with an axial dimension less than the spacing between the groove side walls and an outer section protruding from said groove for sliding sealing engagement with the cylinder wall, said ring inner section being provided with an inner surface and opposite side surfaces, the latter being spaced from the groove side walls, each ring inner section side surface having a first segment extending inwardly from the ring outer section and being in substantially parallel relation with an adjacent groove side wall, and a second segment extending inwardly from said first segment and angularly away from said adjacent groove side wall and terminating at said ring inner surface; a first segment of one side surface of the ring inner section coacting with an adjacent groove side wall to form a first clearance while the first segment of the other side surface of the ring inner section is in frictional engagement with a groove side wall, the second segments of the side surfaces of the ring inner section coacting with both groove side walls to form second clearances, said first and second clearances communicating with one another and with the space formed between the cylinder wall and the head peripheral surface and extending to the endface of the piston head; the corresponding first segments of the inner section side surfaces of the compression ring having unequal dimensions.

2. A compression ring for mounting within an annular groove formed in a piston head of an internal combustion engine, the groove having spaced inwardly extending side walls and an inner wall defining the depth of the groove, said ring comprising an inner section for adjustable disposition within the groove and an integral outer section for protruding outwardly from the groove; said inner section including opposite side surfaces having first segments extending inwardly from the outer section and second segments extending inwardly from the first segments; the first segment of each side surface adapted to be in substantially parallel relation with an adjacent groove side wall and the second segment of the side surface being disposed at a predetermined angle relative to said first segment; when the ring is accommodated in the groove, and is moving at least in one relative direction, the first segment of only one side surface of the ring is adapted to be disposed in substantially spaced relation with an adjacent groove side wall and the second segments of both side surfaces of the ring are adapted to be in continuous spaced relation with the groove side walls; the first segments of the side surfaces of the inner section are in spaced substantially parallel relation and the second segments of said inner section side surfaces taper inwardly towards one another at a predetermined angle from the first segments; corresponding first and second segments of the inner section side surfaces being of unequal dimensions.

3. A compression ring for mounting within an annular groove formed in a piston head of an internal combustion engine, the groove having spaced inwardly extending side walls and an inner wall defining the depth of the groove, said ring comprising an inner section for adjustable disposition within the groove and an integral outer section for protruding outwardly from the groove; said inner section including opposite side surfaces having first segments extending inwardly from the outer section and second segments extending inwardly from the first segments; the first segment of each side surface adapted to be in substantially parallel relation with an adjacent groove side wall and the second segment of the side surface being disposed at a predetermined angle relative to said first segment; when the ring is accommodated in the groove, and is moving at least in one relative direction, the first segment of only one side surface of the ring is adapted to be disposed in substantially spaced relation with an adjacent groove side wall and the second segments of both side surfaces of the ring are adapted to be in continuous spaced relation with the groove side walls; the first segments of the inner section side surfaces taper inwardly towards one another from the outer section at a predetermined primary angle, and the second segments of the inner section side surfaces taper inwardly towards one another from the first segments at a predetermined secondary angle; the secondary angle being greater than the primary angle; corresponding first and second segments of the inner section side surfaces being of unequal dimensions.

* * * * *

UNITED STATES PATENT AND TRADEMARK OFFICE
CERTIFICATE OF CORRECTION

PATENT NO. : 4,815,429

DATED : March 28, 1989

INVENTOR(S) : Thomas E. Thornton

It is certified that error appears in the above-identified patent and that said Letters Patent is hereby corrected as shown below:

Column 2, line 68, "as" should read -- is --.

Column 4, line 13, "i" should read -- it --.

Column 5, line 15, "." should be deleted

Signed and Sealed this

Seventh Day of November, 1989

Attest:

JEFFREY M. SAMUELS

*Attesting Officer*     *Acting Commissioner of Patents and Trademarks*